June 17, 1952  S. LARACH  2,601,032
MANGANESE ACTIVATED ZINC BARIUM SILICATE PHOSPHOR
Filed April 26, 1951
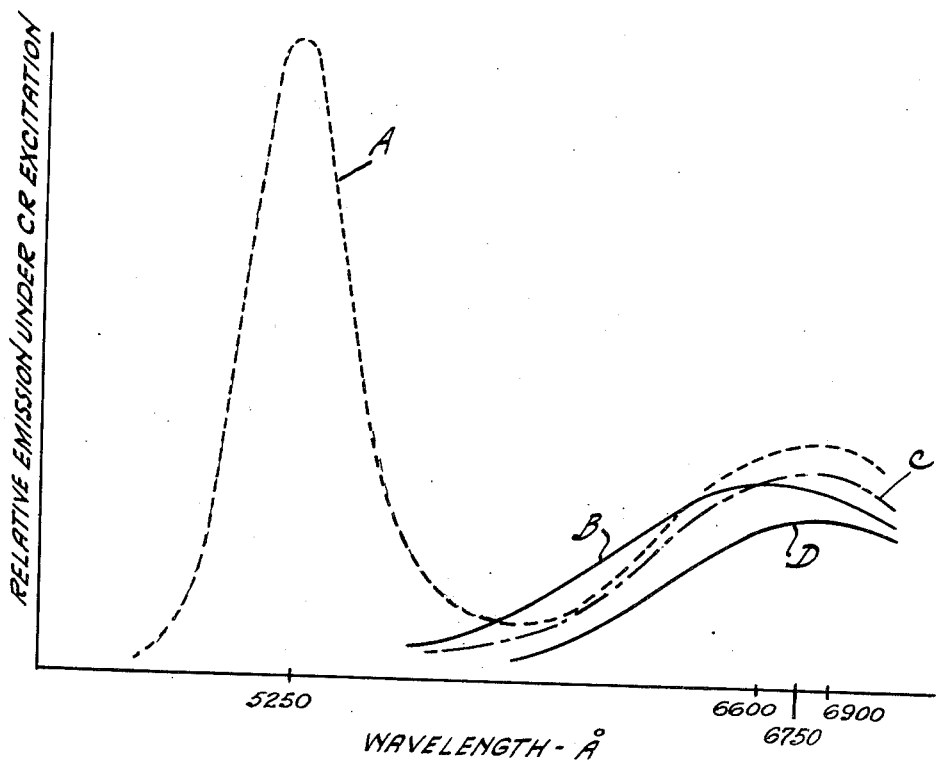
INVENTOR
SIMON LARACH
BY
ATTORNEY Patented June 17, 1952

2,601,032

UNITED STATES PATENT OFFICE 2,601,032

MANGANESE ACTIVATED ZINC BARIUM SILICATE PHOSPHOR

Simon Larach, New Brunswick, N. J., assignor to Radio Corporation of America, a corporation of Delaware Application April 26, 1951, Serial No. 223,020

4 Claims. (Cl. 252—301.6)

This invention relates to improvements in luminescent materials and, more particularly, to cathodo-luminescent materials having strong emission in the red region of the spectrum.

Although, for color television and other purposes, it is often desired to have phosphors with good emission in the red region of the spectrum, such materials are not numerous. The best previously known phosphors emitting in the red region have been manganese activated cadmium borate and manganese activated zinc phosphate. The efficiencies of these materials, however, decrease rapidly in the deep red portion of the visible spectrum.

It has now been found that it is possible to prepare certain manganese activated barium zinc silicate materials which emit strongly in the deep red region. Barium zinc silicate phosphors activated with manganese have previously been prepared but they have been of a type exhibiting red emission only when activated with ultraviolet radiation. These materials, when activated with cathode rays, have exhibited only a strong green luminescence which completely masks the red emission. It has, therefore, not been previously known that it is possible to prepare a manganese activated barium zinc silicate phosphor having good red emission under cathode ray excitation.

One object of the present invention is to provide a novel material having good emission in the deep red region of the spectrum.

Another object of the invention is to provide an improved phosphor having strong emission in the red region of the spectrum and having short decay characteristics.

Another object of the invention is to provide a novel barium zinc silicate phosphor activated with manganese.

Another object of the invention is to provide a novel barium zinc silicate phosphor having emission characteristics different from previously known materials of this class.

These and other objects will be more apparent and the invention will be better understood from the following detailed description and the accompanying drawing, of which The single figure is a graph showing the difference in emission characteristics between previously known barium zinc silicate phosphors and materials of the present invention.

In general, the improved materials of the present invention comprise luminescent barium zinc silicates activated with manganese, in which the molar ratio of barium oxide to zinc oxide and silicon dioxide is either approximately 1:1:2 or approximately 0.3:1:2. In materials having either of these two ratios of oxides, the manganese activator is present between about 0.1% and 2% by weight.

An example of preparation of a preferred material, in accordance with the present invention, will now be given:

Example I

A mixture of the necessary ingredients is prepared in the following proportions:

| | Grams |
|---|---|
| $BaO_2$ | 169.4 |
| $ZnO$ | 81.4 |
| $SiO_2$ | 120.0 |

These materials are thoroughly mixed and then dry-milled for about four hours to insure homogeneity. A sample of any given desired weight is then withdrawn and, to the sample, manganese is added, as an aqueous solution of the chloride, in an amount which will furnish about 1% by weight of manganese in the material, after firing. After slurrying and drying this mixture, the material is placed in a silica crucible and fired at about 1,000° C. The fired material has the composition $BaO \cdot ZnO \cdot 2SiO_2:Mn(1)$ and the emission is in the deep red portion of the spectrum with a peak at about 6,900 Å. The emission efficiency at 6,900 Å. is about 15% higher than manganese activated cadmium borate.

Example II

A material prepared by the same general method as outlined in Example I can be made by mixing the ingredients in the following proportions:

| | Grams |
|---|---|
| $BaO_2$ | 50.8 |
| $ZnO$ | 81.4 |
| $SiO_2$ | 120.0 |

Sufficient manganese chloride is added to this mixture to give 0.5% by weight manganese in the final product, after firing. Emission of this material is also in the deep red region of the spectrum but is shifted somewhat toward the orange compared to the emission of the material described in Example I.

The materials described in the above two examples are the only ones, so far as ratio of barium, zinc, and silicon oxides is concerned, which have been found in this system to have good emission in the deep red region of the spectrum. If the ratios of barium dioxide to zinc oxide and silicon dioxide, as given in these examples, are not approximately adhered to, materials having different emission characteristics will be obtained. In most cases, using substantially different ratios of the oxides, materials having predominantly green emission are found and, in a few cases, materials are obtained having predominantly blue emission. The discovery of materials in this system having emission in the deep red region, under cathode ray excitation, was, therefore, entirely unexpected.

Although the ratios of the barium, zinc, and silicon oxides must be maintained approximately as indicated in the two examples, certain departures from the method of preparation described in the examples can be made without departing from the spirit of the invention. For example, the manganese activator can be varied between about 0.1% and 2% by weight. Variation of the manganese content has two effects. These are illustrated in the figure. This figure contains four different curves, three of which are for materials prepared in accordance with the present invention. Curve A, however, is included for purposes of comparison and shows peak wavelengths of emission for a material having the composition $BaO \cdot 2ZnO \cdot 2SiO_2:Mn(1)$. As indicated by the curve, this material has strong emission at about 5,250 Å. and, although it has another peak emission at about 6,900 Å., the green band is so much stronger than the red band that the latter is completely masked so far as the eye is concerned. Curves B, C, and D are for materials made in accordance with the present invention. Curve B is for a material having the composition $BaO \cdot ZnO \cdot 2SiO_2:Mn(0.2)$. This material has a peak emission in the orange red region of the spectrum at about 6,600 Å. Curve C is for a material having the composition $BaO \cdot ZnO \cdot 2SiO_2:Mn(0.5)$. This material has a peak emission in the red region of the spectrum at about 6,750 Å. Its visible emission color is, therefore, more deeply red than the material of Curve B. The material of Curve D has the composition $BaO \cdot ZnO \cdot 2SiO_2:Mn(1)$. Its peak emission is about 6,900 Å. It will thus be seen that the peak emission of these materials can be varied between orange red and deep red by varying the percentage of manganese activator between the amounts previously indicated. If substantially more than 2% manganese is used, the material has an increasingly black appearance in daylight and is undesirable for use as a luminescent material.

Besides causing a shift in peak emission wavelength, variation of manganese content within the limits specified, also causes a shift in the short-wavelength feet of the emission curves. This effect is also apparent from curves B, C, and D of the figure.

Although manganese chloride is preferred as a source of manganese activator, any other convenient source of manganese can be used. For example, it is possible to use other soluble compounds of manganese, such as the nitrate, or insoluble compounds, such as any of the oxides.

It is also possible to use any other convenient source of materials which will yield barium oxide, zinc oxide and silicon dioxide when heated to the firing temperatures required.

Although a firing temperature of about 1,000° C. is preferred, it is possible to use firing temperatures from about 900° C. to 1,200° C. The firing temperature is not particularly critical, but should be below the melting point of the mixture. This varies with different mixtures, and 1,000° C. may be taken as a mean value.

The materials are fired in an atmosphere of air or any other non-reducing atmosphere.

The firing time is relatively unimportant, so long as it is sufficient to yield the desired solid-state reaction in the synthesis of the phosphor. An average firing time is about 30 minutes, although firings of one-half or twice this time may also be used.

The materials of the present invention have short decay periods, making them suitable for use in cathode ray tubes, either alone or mixed with other phosphors having different emission characteristics, where red emission or a red emission component is desired. The materials can also be used in color television as the red-emitting component of the luminescent materials.

I claim as my invention:

1. A luminescent material having predominantly red emission under cathode ray excitation, said material comprising manganese activated barium zinc silicate in which the ratios of barium oxide, zinc oxide, and silicon dioxide are selected from the group consisting of 1:1:2 and 0.3:1:2, and in which the manganese activator is present between about 0.1 and 2% by weight.

2. A material according to claim 1 in which said ratio is 1:1:2.

3. A material according to claim 2 in which said manganese content is 0.5% by weight.

4. A material according to claim 1 in which said ratio is 0.3:1:2.

SIMON LARACH.

REFERENCES CITED

The following references are of record in the file of this patent:

UNITED STATES PATENTS

| Number | Name | Date |
|---|---|---|
| 2,540,804 | Anderson | Feb. 6, 1951 |